Oct. 7, 1969   C. ROTHAUSER   3,470,900
TRAP
Filed Sept. 15, 1966
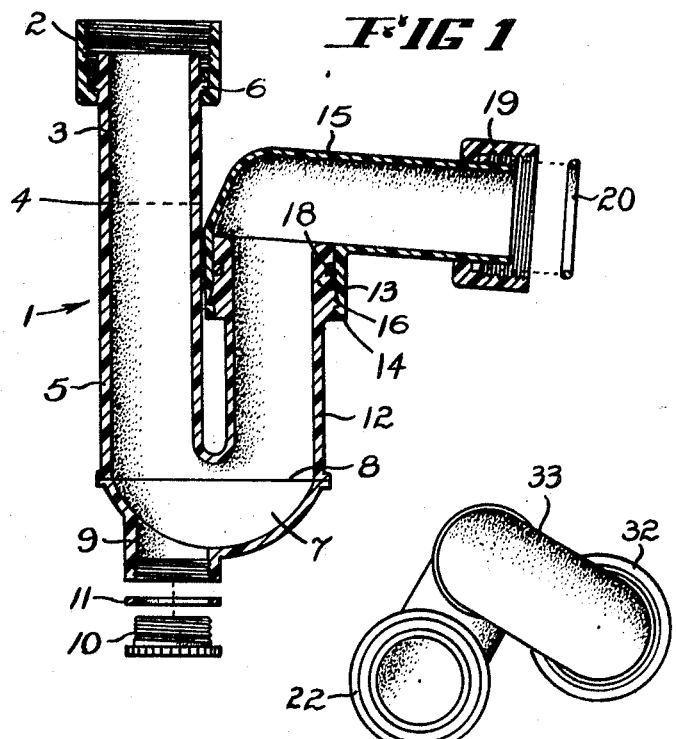
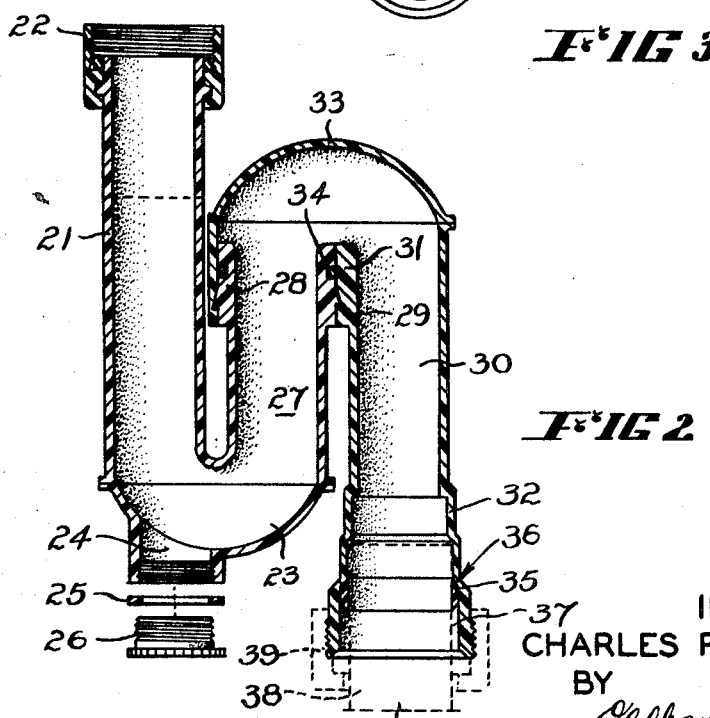
INVENTOR.
CHARLES ROTHAUSER
BY
Oldham & Oldham
ATTYS.

3,470,900
TRAP
Charles Rothauser, Norwood, South Australia, Australia, assignor to Industrial Products Proprietary Limited, Norwood, South Australia, Australia
Filed Sept. 15, 1966, Ser. No. 579,739
Claims priority, application Australia, Sept. 20, 1965, 64,211/65
Int. Cl. E03c 1/284
U.S. Cl. 137—247.51          2 Claims

ABSTRACT OF THE DISCLOSURE

An improved trap including an inlet section and an outlet section are joined together to allow orientation of one section in relation to the other section. A joint including a spigot on one section and a socket on the other section is provided to secure the sections together and where an annular tapered protrusion on the spigot has a terminal shoulder and an annular recess complementary to the protrusion and shoulder is provided in the socket to receive and permanently engage the spigot and socket.

---

This invention relates to an improved trap and in particular it relates to a trap of the type generally used in plumbing where it is necessary to provide a water seal between a basin and a waste pipe or the like.

It is of course well known that traps of many types exist, these being known either as P-type traps, that is traps in which a downward section bends upwardly and outwardly, or S-type traps in which the final member of the trap extends downwardly.

Traps may be formed by casting or moulding and are usually provided at their upper end with a nut or similar device whereby they can be attached to the tail of a sink or the like while their other end is adapted to be joined to a waste pipe by a nut or other means, the lower part of the water seal section of the trap being provided with a normally sealed drain aperture for cleaning purposes.

One of the problems with traps is that a considerable space is required by these as constructed at the present time and also because of their construction little or no adjustment is possible between the inlet and outlet ends, a condition which would be very desirable for ease of installation and to save space, and it is therefore the object of this invention to provide an improved form of trap in which firstly construction will be simplified and secondly the shape will be improved to allow a required adjustment between the inlet and outlet sections which will greatly facilitate installation by allowing the position of the ends to be varied in relation to each other to suit the location of the members to which the trap is to be connected.

These and other advantages which will be apparent from the specification are achieved by forming the trap in at least two major sections, each including a bend, which are joined one to the other to allow one section to orientate in relation to the other section.

To enable the nature of the invention to be fully appreciated an embodiment will now be described of both a P trap and an S trap but it is to be clear that the invention need not necessarily be limited to these embodiments, the scope being defined by the claims herein.

In the drawings:

FIG. 1 is a central longitudinal section of a P trap,

FIG. 2 is a similar section of an S trap, and

FIG. 3 shows in plan how the two major sections can be angled one in relation to the other if required.

According to the first of these embodiments illustrated in FIG. 1 the trap comprises an inlet section 1 consisting of a plastic tube which has at its one end a captive nut 2 which is adapted to engage the tail pipe of a sink or the like, which nut is preferably positioned on an upper part 3 of the depending section of the tube prior to this part of the tube being welded at 4 to a lower part 5 of the depending section of the tube so that the nut is then held captive on the tube and is prevented from leaving the tube by means of a flange 6 against which it bears when it is moved towards the end of the tube, this end of the tube being adapted to fit into the tail pipe while the nut engages the thread on same. To form a water tight joint a resilient washer is preferably used within the nut, which washer bears against the flange 6 and is confined between this flange and the lower face of the tail piece.

The bend 7 is formed of a further plastic member which is welded at 8 to the tubular member 5 just described and has in it the drain aperture 9 which is displaced from the centre of the bend 7 to be approximately under the inlet part of the trap, this aperture 9 being provided with a screwed plug 10 and washer 11 so that it is normally sealed but allowing same to be opened by removing the plug 10.

On the other side of the bend 7 is an upstanding section 12, and the upper part of this upstanding section 12 is shaped to form a spigot 13 which engages a socket 14 forming the outlet section 15 of this trap, the socket 16 being adapted to push over the spigot 13 because of the resiliency of the plastic, the spigot 13 being provided with an annular tapered protrusion 16 having a terminal shoulder 16a which engages a complementary annular recess in the socket 14 to give axial confinement of the socket 14 on the spigot 13 and including also between them an annular groove 18 in which is disposed a sealing ring to ensure a water-tight and air-tight seal at this locality, the outlet section 15 extending outwardly from the socket and having on its end a nut 19 and sealing ring 20 whereby it may be joined to a waste pipe or the like.

By utilising a spigot and socket joint between the inlet section 1 and the outlet section 15 it will be realised that it is possible to turn the outlet section 15 in relation to the inlet section 1 and thereby facilitate connection, because this outlet section can turn through a considerable angle 180 degrees and therefore the actual position of the bend can be varied in its relationship to the outlet section.

The second type, as illustrated in FIG. 2, namely the S-type, has its inlet section 21 again constructed in a similar manner to the first form which was described and includes the nut 22 and the bend 23 and aperture 24 at the bottom of the bend with its sealing washer 25 and plug 26, and the section 27 has the spigot 28 with its tapering annular protrusion 29. The outlet section 30 curves over and down to form at one end of the socket 31 and at the other end a downwardly projecting waste pipe connector 32, the outlet section having a separate bend closure 33 welded to it for ease of construction and a seal being again formed between the spigot 28 and socket 31 by a resilient ring in an annular groove 34.

The outlet section 30 can again be turned about the spigot 28 of the inlet section to again allow a very considerable range of positions to be attained in which the unit can be used. One such position is shown in FIG. 3.

In both of the above described embodiments the outlet section can be provided with a series of stepped sockets, that is with a series of progressively changing diameters, but this construction is shown only in FIGS. 2 and 3, the purpose being to allow waste pipes or other members of different outer diameter to be accommodated in this end, the preferred arrangement including sufficient steps that connection can be made to a galvanized iron pipe, a plastic pipe, and a copper pipe, these pipes according to selection being inserted into the outlet end to accommodated in the correct diameter within the outlet end, the pipe being then locked in position and sealed in any suitable manner, for instance by using a resilient ring 35 locked against the step 36 by means of a sleeve 37 slidable along the outside of the tail pipe 38 and having a flange engaged by a nut 30 engaging a thread on the outer end of this stepped section, the arrangement being such that by use of an appropriate length of pressure member a seal can be made on the section of the pipe 38 which is engaged in the stepped socket into which it fits.

It will be relaized of course that an end other than the stepped universal end just described can be used, but by constructing a trap with this feature it is possible to connect it to a waste or other pipe selected from any having an appropriate outside diameter corresponding with the steps in the trap, a feature which, coupled with the fact that the trap can be orientated about the spigot and socket ensuring that a very universal type of attachment is given which can not only engage pipes of different diameter but can also have a wide variation in the relationship between the attachment of the trap to the tail of the sink or the like and the position of the waste pipe or the like.

As previously stated a trap of the nature outlined can be constructed of plastic or other suitable material, the advantage of the plastic trap being that it is less subject to deterioration in use and also it can be formed in a very smooth and neat manner and can be constructed of sections which can readily be welded together, enabling somewhat lesser radius bends to be attained than otherwise and thus greatly reducing the overall size of the trap, which reduction in size is again greatly enhanced because of the spigot and the socket joint.

It will be realyised that the spigot and socket can be reversed in their position as the socket could be formed on the inlet section of the trap and the spigot on the outlet section, the only requirement here being that the spigot and socket shall be so arranged that when the two parts are pushed together there will be an axial lock between the parts which will however allow rotation, and also a seal should be provided to ensure that there is no air or water leakage at this junction.

It will also be obvious that a trap constructed in this way need not necessarily be of circular section as it is advantageous to flatten some of the walls at the bend so that at this section the tubes forming the trap will be of somewhat D shape.

While two embodiments of the invention have been disclosed herein, it will be appreciated that modification of these particular embodiments of the invention may be resorted to without departing from the scope of the invention.

What I claim is:

1. An improved trap formed of plastic material comprising at least two major sections of which one is an inlet section and the other an outlet section, each including a bend, joined together to allow orientation of one section in relation to the other section, wherein the joint comprises a spigot on one section and a socket on the other section with axially confining configuration and sealing means between them, characterized by an annular tapered protrusion on the spigot having a terminal shoulder, an annular recess complementary to said protrusion and shoulder in the socket into which the said protrusion is adapted to be engaged by axial movement and expansion of the socket to confine the spigot axially with respect to the socket in a permanent manner, an annular groove in the spigot facing the said socket, and a resilient sealing ring in the said groove.

2. An improved trap according to claim 1 with the inlet section comprising a depending section and an upstanding section and an apertured bend section joining same, said depending section being formed of two parts permanently joined together, a captive nut on said depending section and permanently rotatably secured thereto, and a plug to seal the aperture in the said bend, said aperture being offset on the bend to be disposed beneath the depending section.

References Cited

UNITED STATES PATENTS

| | | | |
|---|---|---|---|
| 154,638 | 9/1874 | Brooke | 137—247.51 |
| 269,177 | 12/1882 | Chapman | 137—247.51 |
| 598,992 | 2/1898 | Hosford | 137—247.51 |
| 2,037,625 | 4/1936 | Goepel et al. | 137—247.51 |
| 2,452,219 | 10/1948 | Bergvall et al. | 285—193 |
| 2,706,122 | 4/1955 | Bright | 285—423 XR |
| 2,770,476 | 11/1956 | Cleverly | 285—423 XR |
| 2,889,847 | 6/1959 | Schober | 285—260 XR |
| 2,985,469 | 5/1961 | Bowman | 285—423 XR |
| 3,217,400 | 11/1965 | Illesy et al. | 285—423 XR |
| 3,245,703 | 4/1966 | Manly. | |

FOREIGN PATENTS 404,315  6/1966  Switzerland.

JORDAN FRANKLIN, Primary Examiner
W. H. SCHROEDER, Assistant Examiner

U.S. Cl. X.R.

285—157, 332.3, 423